(12) United States Patent
Szady et al.

(10) Patent No.: US 12,455,768 B2
(45) Date of Patent: Oct. 28, 2025

(54) ITERATIVE SYSTEM FOR MASSIVELY PARALLEL PROCESSING AND METHODS FOR USE THEREWITH

(71) Applicant: BEIT Sp. z o.o., Cracow (PL)

(72) Inventors: Adam Szady, Cracow (PL); Witold Jarnicki, Cracow (PL)

(73) Assignee: BEIT Sp. z o.o., Cracow (PL)

( * ) Notice: Subject to any disclaimer, the term of this patent is extended or adjusted under 35 U.S.C. 154(b) by 0 days.

(21) Appl. No.: 18/901,057

(22) Filed: Sep. 30, 2024

(65) Prior Publication Data

US 2025/0165285 A1 May 22, 2025

Related U.S. Application Data

(60) Provisional application No. 63/599,723, filed on Nov. 16, 2023.

(51) Int. Cl.
*G06F 9/48* (2006.01)
*G06F 9/54* (2006.01)

(52) U.S. Cl.
CPC ............ *G06F 9/4881* (2013.01); *G06F 9/546* (2013.01)

(58) Field of Classification Search
CPC ................. G06F 9/4881; G06F 9/546
See application file for complete search history.

(56) References Cited

U.S. PATENT DOCUMENTS

| | | | |
|---|---|---|---|
| 2006/0080668 A1* | 4/2006 | Blackmore | G06F 9/544 719/312 |
| 2008/0008472 A1* | 1/2008 | Dress | H04B 10/803 398/118 |
| 2009/0037377 A1* | 2/2009 | Archer | G06F 16/24532 |
| 2011/0270942 A1 | 11/2011 | Archer | |

(Continued)

FOREIGN PATENT DOCUMENTS

| | | |
|---|---|---|
| CN | 105610707 A | 5/2016 |
| CN | 115408980 B | 1/2023 |

(Continued)

OTHER PUBLICATIONS

Cerebras Systems; SDK Release Notes; Version 0.3.0; 3 pages; Jan. 24, 2022.

(Continued)

*Primary Examiner* — Charles E Anya
(74) *Attorney, Agent, or Firm* — Katz Ruby & Carle LLP; Katherine C. Stuckman; Bruce E. Stuckman

(57) ABSTRACT

A computing system includes: a computational engine having a plurality of processing elements arrayed in accordance with a grid topology, wherein each of the plurality of processing elements is configured to perform one of a plurality of processing functions, and wherein the plurality of processing functions include a principal function, a kernel function, a routing function, and a reducer function; and a host processor having at least one processing circuit and at least one memory that stores operational instructions that, when executed by the at least one processing circuit, cause (Continued)

the at least one processor to: receive a task input; and control the computational engine in accordance with an iterative reduce-broadcast-apply process to generate a task output that is based on the task input.

20 Claims, 3 Drawing Sheets

(56) References Cited

U.S. PATENT DOCUMENTS

| | | | |
|---|---|---|---|
| 2014/0177470 A1* | 6/2014 | Roitshtein | H04L 49/00 370/254 |
| 2017/0083387 A1* | 3/2017 | Prasad | G06F 9/45504 |
| 2018/0189110 A1* | 7/2018 | Venkatesh | G06F 9/5083 |
| 2021/0303704 A1* | 9/2021 | Chen | G06N 5/01 |
| 2022/0188147 A1* | 6/2022 | Nudelman | G06F 9/485 |
| 2023/0144553 A1* | 5/2023 | Damani | G06F 9/3009 718/102 |
| 2023/0153153 A1* | 5/2023 | Ke | G06F 9/44505 718/102 |

FOREIGN PATENT DOCUMENTS

| | | | |
|---|---|---|---|
| CN | 115809533 A | 3/2023 | |
| CN | 116258862 A | 6/2023 | |
| WO | WO-2015179509 A1 * | 11/2015 | G06F 9/45504 |

OTHER PUBLICATIONS

International Searching Authority; International Search Report and Written Opinion; International Application No. PCT/US2024/8049392; Jan. 15, 2025; 8 pgs.

* cited by examiner

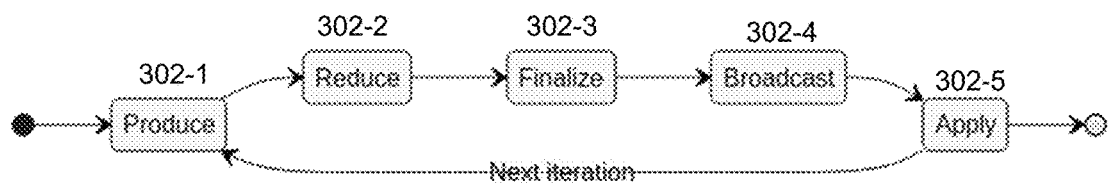
300
FIG. 3
```
KKK...Kr
KKK...KR
......KR
KKK...KR
rrr...rP
```
400
FIG. 4
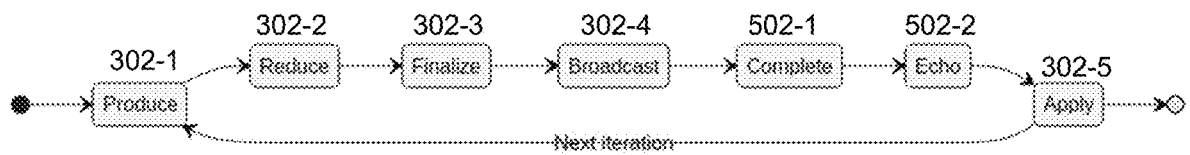
500
FIG. 5

ITERATIVE SYSTEM FOR MASSIVELY PARALLEL PROCESSING AND METHODS FOR USE THEREWITH

CROSS-REFERENCE TO RELATED APPLICATIONS

The present U.S. Utility Patent Application claims priority pursuant to 35 U.S.C. § 119 (e) to U.S. Provisional Application No. 63/599,723, entitled "ITERATIVE SYSTEM FOR MASSIVELY PARALLEL PROCESSING AND METHODS FOR USE THEREWITH", filed Nov. 16, 2023, which is hereby incorporated herein by reference in its entirety and made part of the present U.S. Utility patent application for all purposes.

BACKGROUND OF THE INVENTION

Technical Field of the Invention

This invention relates generally to computer systems and also to parallel processing.

BRIEF DESCRIPTION OF THE SEVERAL VIEWS OF THE DRAWING(S)

FIG. 3 is a schematic flow diagram of an example of a reduce-broadcast-apply (RBA) computing framework in accordance with the present disclosure;

FIG. 4 is a symbolic layout of example processing element functions of a massive grid topology computational engine in accordance with the present disclosure;

FIG. 5 is a schematic flow diagram of an example of a reduce-broadcast-apply (RBA) computing framework in accordance with the present disclosure;

DETAILED DESCRIPTION OF THE INVENTION

Figure 1:
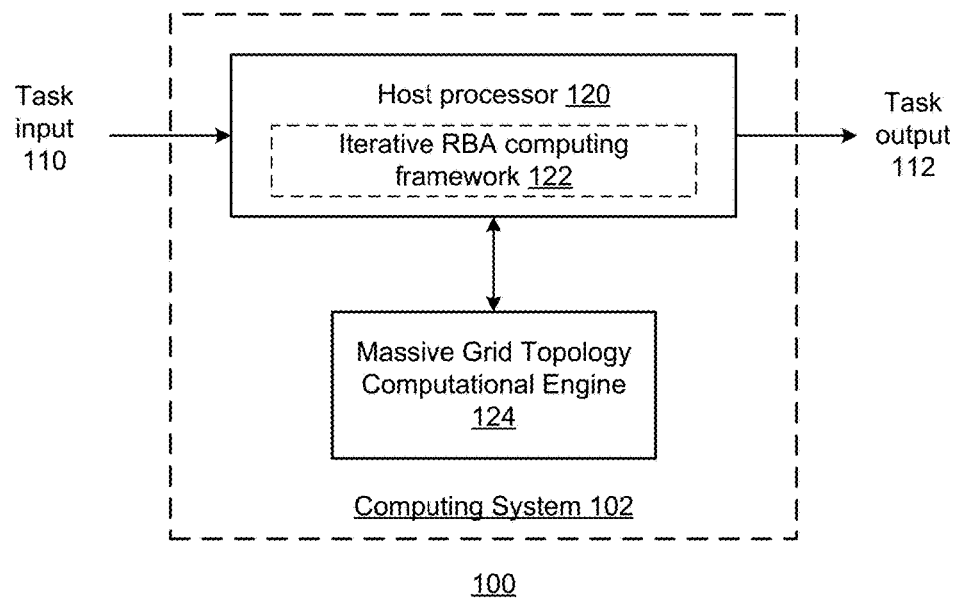
FIG. 1 is a schematic block diagram of an example of a computing system in accordance with the present disclosure.

FIG. 1 is a schematic block diagram 100 of an example of a computing system in accordance with the present disclosure. The computing system 102 includes a host processor 120 and a massive grid topology computational engine 124. In operation, the computing system 102 receives a task input 110 and the host processor 120 controls the massive grid topology computational engine 124 in accordance with an iterative reduce-broadcast-apply (RBA) computing framework (that can also be called an iterative RBA process) to generate a task output 112 that is based on the task input 110.

In various examples, the host processor 120 includes a processing module and/or one or more other processing devices that operate via classical computing. Each such processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The host processor 120 operates in conjunction with an attached memory and/or an integrated memory element or other memory device, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information.

Note that if the host processor 120 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the host processor 120 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory stores, and the host processor 120 executes, hard coded and/or other operational instructions corresponding to at least some of the steps and/or functions illustrated in one or more of the Figures. Such a memory device or memory element can be tangible memory device or other non-transitory storage medium included in or implemented as an article of manufacture.

Figure 2:
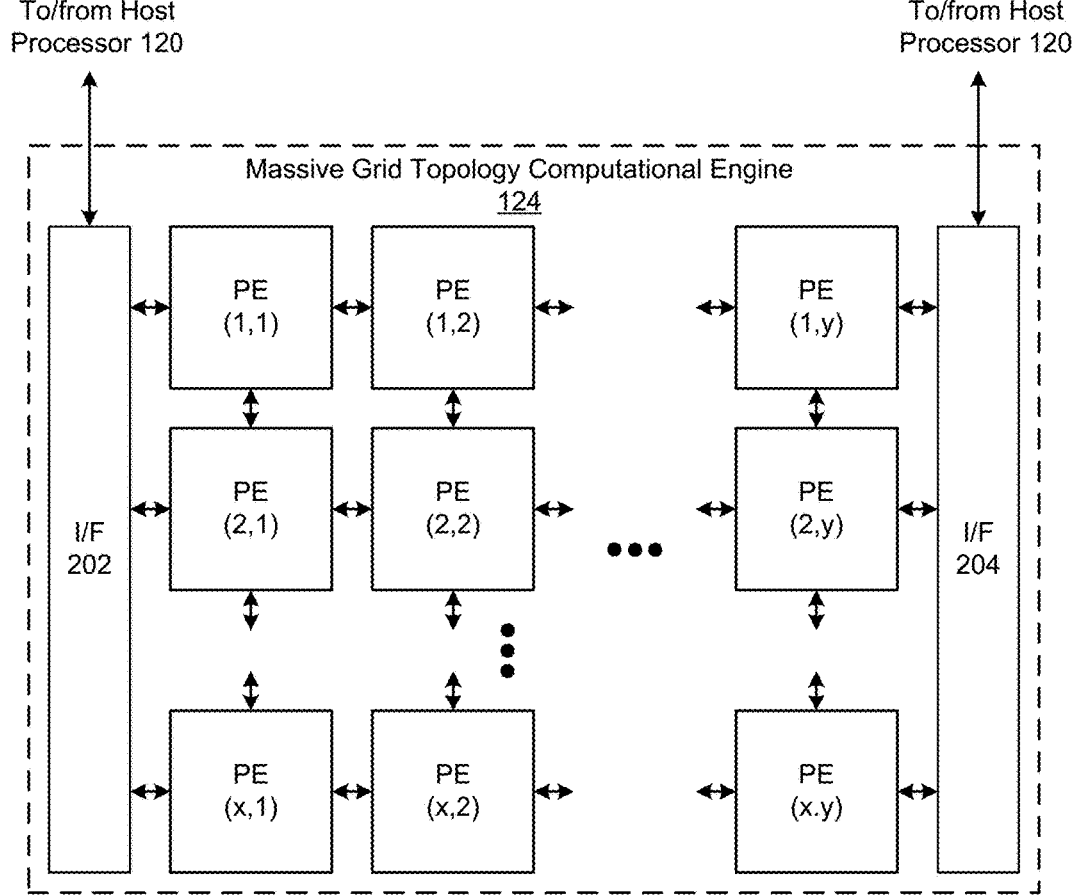
FIG. 2 is a schematic block diagram of an example of a massive grid topology computational engine in accordance with the present disclosure.

In various examples, the massive grid topology computational engine 124 is a processing unit such as a wafer-scale engine (WSE) or other processing device having a massive number (i.e., 100,000 or more) individual processing elements (PEs) that are arrayed in a x-by-y square or rectangular grid topology as shown in FIG. 2 and that operate in parallel. In various embodiments, the grid topology can be described utilizing the terms "columns" and "rows" which generally pertain, respectively, to vertical and horizontal one-dimensional arrays of PEs of a two-dimensional grid however, these terms can be used interchangeably because the actual orientation of the PEs is arbitrary in the context of computation. Furthermore, while a two-dimensional array is presented, PEs can be implemented in higher-dimensional configurations.

In various examples, the massive grid topology computational engine 124 may have one or more of any of the following attributes:

- The PEs are laid out in a square (x=y) or rectangular array (x≠y) and are each configurable to perform different processing functions,
- Each PE has a small amount (e.g., 48 KB) of its own memory,
- There is no global memory that is shared among the PEs,
- A PE can only send data to its four nearest neighbors, i.e., the directly adjacent,
- The engine communicates with host processor via interfaces (I/F) ports 202 and 204 which can be located, for example, on opposing sides of the array.

Consider the following example where the massive grid topology computational engine 124 or other computational engine has a plurality of processing elements arrayed in accordance with a grid topology, wherein each of the plurality of processing elements is configured to perform one of a plurality of processing functions, and wherein the plurality of processing functions include a principal function, a kernel function, a routing function, and a reducer function. The host processor 120 includes at least one processing circuit and at least one memory that stores operational instructions that, when executed by the at least one processing circuit, cause the at least one processing circuit to:
receive a task input; and
control the computational engine in accordance with an iterative reduce-broadcast-apply process to generate a task output that is based on the task input.

In addition or in the alternative to any of the foregoing, the iterative reduce-broadcast-apply process includes a produce operation, a reduce operation, a broadcast operation and an apply operation.

In addition or in the alternative to any of the foregoing, the produce operation is implemented by a subset of the plurality of processing elements performing corresponding kernel functions that operate in parallel to generate corresponding operation shards.

In addition or in the alternative to any of the foregoing, the reduce operation is implemented by a subset of the plurality of processing elements performing corresponding reducer functions that operate to receive two operation shards as input and produce a single operation shard as output.

In addition or in the alternative to any of the foregoing, a subset of the plurality of processing elements performing corresponding router functions operate to perform message routing between others of the plurality of processing elements.

In addition or in the alternative to any of the foregoing, the iterative reduce-broadcast-apply process further includes a finalize operation and wherein the plurality of processing functions further include a principal function corresponding to performance of the finalize operation.

In addition or in the alternative to any of the foregoing, the plurality of processing elements includes a subset of processing elements that performs the finalize operation and wherein the finalize operation generates a result.

In addition or in the alternative to any of the foregoing, the broadcast operation operates to send the result of the finalize operation to the subset of the plurality of processing elements performing corresponding kernel functions.

In addition or in the alternative to any of the foregoing, the apply operation operates to applies results of the finalize operation to the subset of the plurality of processing elements performing corresponding kernel functions.

In addition or in the alternative to any of the foregoing, the apply operation is performed by a single one of the plurality of processing elements.

In addition or in the alternative to any of the foregoing, the apply operation is performed by a selected ones of the plurality of processing elements.

In addition or in the alternative to any of the foregoing, the plurality of processing elements includes a plurality of kernel patches, each kernel patch including a plurality of kernels, the plurality of operations further include a complete operation and an echo operation wherein the apply operation is implemented by performance of the complete operation by a single one of the plurality of processing elements from each kernel patch and performance of the echo operation by other ones of the plurality if processing elements.

In addition or in the alternative to any of the foregoing, the computational engine is implemented via a wafer-scale engine.

In addition or in the alternative to any of the foregoing, each of the plurality of processing elements has a dedicated memory.

In addition or in the alternative to any of the foregoing, the computational engine lacks global memory that is shared by the each of the plurality of processing elements.

In addition or in the alternative to any of the foregoing, the task input and task output correspond to a quadratic unconstrained binary optimization over a binary vector $v=(v_1, v_2, \ldots v_n)$.

In addition or in the alternative to any of the foregoing, n of the plurality of processing elements performing corresponding kernel functions each store a current value of $v_j$, where $j=1 \ldots n$.

In addition or in the alternative to any of the foregoing, each of the plurality of processing elements performing corresponding kernel functions performs a produce operation that computes a change in cost that would occur if the current value of $v_j$ was inverted for $j=1 \ldots n$, wherein the reduce operation generates an update to the current value of $v_j$ by selecting a single $v_j$ that generated a most favorable cost when inverted, wherein the broadcast operation sends the update to the current value of $v_j$ to each of the plurality of processing elements performing corresponding kernel functions and wherein the apply functions applies the update to the current value of $v_j$ to each of the plurality of processing elements performing corresponding kernel functions.

Further examples including many optional functions and features that may be used in addition to or in the alternative to any of the functions and features above, are presented in conjunction with the Figures that follow.

FIG. 3 is a schematic flow diagram of an example of a reduce-broadcast-apply (RBA) computing framework in accordance with the present disclosure. In particular, an iterative RBA computing framework 122 is presented for performing a certain type of computation on the massive grid topology computational engine 124, which can be called an iterative Reduce-Broadcast-Apply (RBA) computing framework. This framework allows for running multiple Tasks. Each Task consists of multiple iterations. Simplistically, each iteration involves a reduce operation 302-2, a broadcast operation 302-4, and an apply operation 302-5, however, in the example shown, a produce operation 302-1 and finalize operation 302-3 are also included. It should be noted that each of these operations can also be referred to as "steps".

Consider further that each of the PEs can perform one of a plurality of functions (which can also be referred to as "function types" or more simply "types" of PEs):
Kernel (K)—for the actual processing; holds shards of data, participates in produce, reduce, and apply operations.
Reducer (R)—only for reduce operations.
Principal (P)—for finalize operation; also holds global state for task, can orchestrate the overall work on a task.
Router (r)—for message routing only.

In addition or in the alternative, one or more other function types can be implemented in further examples.

Consider further the following abstract structures/functions that can be defined for each task to be performed.
Structures
TaskLocalState—data specific to a Task, stored in a single Kernel.
SharedLocalState—shared data for all Tasks, stored in a single Kernel.
TaskGlobalState—data specific to a Task, stored in a Principal.
SharedGlobalState—shared data for all Tasks, stored in a Principal.
OperationShard—data used in process of negotiating Operation, subject to reduce operation across all Kernels.

Operation—data representing the negotiated action to broadcast to all Kernels.

CompletedOperation—data representing the completed operation to be echoed within a Kernel patch. Contains task number.

These structures can be defined with corresponding functions for serialization and deserialization. Alternatively, the memory can be sent as-is between PEs, if the hardware allows that.

Functions produce (TaskLocalState, SharedLocalState)→OperationShard—run in Kernel.

reduce (OperationShard, OperationShard)→OperationShard—run in Kernel and Reducer.

finalize (OperationShard, TaskGlobalState, SharedGlobalState)→Operation—run in Principal.

complete (TaskLocalState, SharedLocalState, Operation) →CompletedOperation—run in Kernel.

apply (TaskLocalState, SharedLocalState, CompletedOperation)→LocalState—run in Kernel.

Note that a symbolic layout of example processing element functions of a massive grid topology computational engine 124 is shown in FIG. 4. An example of the routing process can be described below, where "east" represents the rightmost side of the array and "west" represents the leftmost side of the array, "north" represents the top of the array and south refers to the bottom of the array, with reference to the orientation that is shown.

Messages with OperationShard are sent from west to east-between Kernels, eventually reaching the Reducers on the east edge.

Then messages with OperationShard are sent from north to south-between Reducers, eventually reaching the Principal on the south-east corner.

Messages with Operation are sent simultaneously to all south routers (from east to west). Each of such router sends a copy of the message to the north and it propagates all the way to the north edge.

(optional—see "Collaborational apply" below) A representative of a Kernel patch capable of performing a complete operation completes the message with Operation making it a message with CompletedOperation that is subsequently sent west and east within the Kernel patch, so that it reaches all Kernels in one row. Each of the Kernels within the row the sends the message with CompletedOperation north and south within their respective column within the Kernel patch.

Furthermore, each PE function type can process messages differently:

Kernel—there are two cases:

Westmost—emits a sequence of OperationShard.

non-westmost—receives a sequence of OperationShard and emits same type of sequence in response to each incoming message.

In both cases, Kernel also receives a sequence of Operation. Both incoming sequences are ordered by task number, but not synchronized with each other. Interleaving between emit/receive OperationShard and receive Operation tasks is subject to local task scheduling.

Optionally, Kernel also takes part in completing an Operation and echoing CompletedOperation within a Kernel patch. The CompletedOperation messages have no guarantee of order, so they will be internally within the framework enriched with this data.

Reducer—expects two sequences of OperationShards coming from two directions. Each of them is ordered (by task), but they are not necessarily synchronized with each other. Reducer stores in memory the first incoming message for a task. When the matching one comes from another direction, computation is performed and OperationShard output. That makes the output ordered by task number.

Principal—expects OperationShards coming in an ordered sequence (by task), outputs Operation in the same sequence.

In further examples, and in some problem types, the memory available to a single PE is insufficient to robustly perform an apply operation within a single PE. In such a case, Kernel patches can be introduced that share the responsibility to perform all respective apply operations among them. For example, each broadcast operation 302-4 requires a complete operation 502-1 to be performed by exactly one Kernel within a Kernel patch (possibly different for every Task) before performing the apply operation 302-5. This detailed operation is then echoed (e.g., via and echo operation 502-2) within the Kernel patch to other Kernels and then finally, the apply operation 302-5 can be performed as shown in FIG. 5.

Consider a further example where the computing system 102 is used to perform a Quadratic Unconstrained Binary Optimization (QUBO) annealing via the iterative RBA computing framework 122. The input of a QUBO problem is a symmetric matrix $M=(M_{ij})$ of size n×n. The task is to find a vector $v=(v_1, v_2, \ldots v_n)$ where each entry is either 0 or 1, with the cost as small as possible. The cost C is given by the formula $$\sum_{i,j=1}^{n} M_{ij} v_i v_j$$

An annealing procedure can be applied. At all times, maintain a current vector $v=(v_1, v_2, \ldots v_n)$. Then the following loop is executed via a large number of iterations until the annealing converges on a final vector that yields the lowest (most favorable cost) C.

Choose a random number $1 \le i \le n$

Consider flipping the value of the vector at position $v_i$ (if $v_i$ is currently equal to zero, we can only change it to 1, and vice versa). This change will result in a change of the cost. Represent the cost changes by $\Delta C$.

Depending on $\Delta C$, perform this change or not (if the change is negative, perform the change. Otherwise we discard the change with some probability. The larger $\Delta C$ is, the more likely we are to discard the change).

This algorithm can be applied to the computing system 102 as follows:

As above, at all times we keep a current vector $v=(v_1, v_2, \ldots v_n)$.

Each kernel is assigned a ID from 1 to n. Each kernel keeps in its memory:

the value of $v_j$

The entries of the row and column of matrix M corresponding to the ID of the kernel. The j-th kernel keeps the j-th row of M in its memory. (note that keeping the entire matrix M would be impossible, since there is not enough memory on a single PE)

In the produce step 302-1, the j-th kernel computes the change to cost that would happen if $v_j$ was flipped. The OperationShard consists of the ID j and the computed change.

In the reduce step 302-2, a single change is selected (as in traditional annealing, we give preference to the changes that lower the cost)

In the finalize step 302-3, nothing needs to be done for this particular problem, In the broadcast step 302-4 and apply step 302-5, the selected change is sent back to all kernels. Each kernel updates its local data to reflect this change. After this step, the next iteration can be performed.

While the foregoing procedures have been described in terms of QUBO minimization, a similar procedure could be employed to QUBO maximization, mutatis mutandis, in which case the "most favorable" cost would be the C with largest value.

Figure 6:
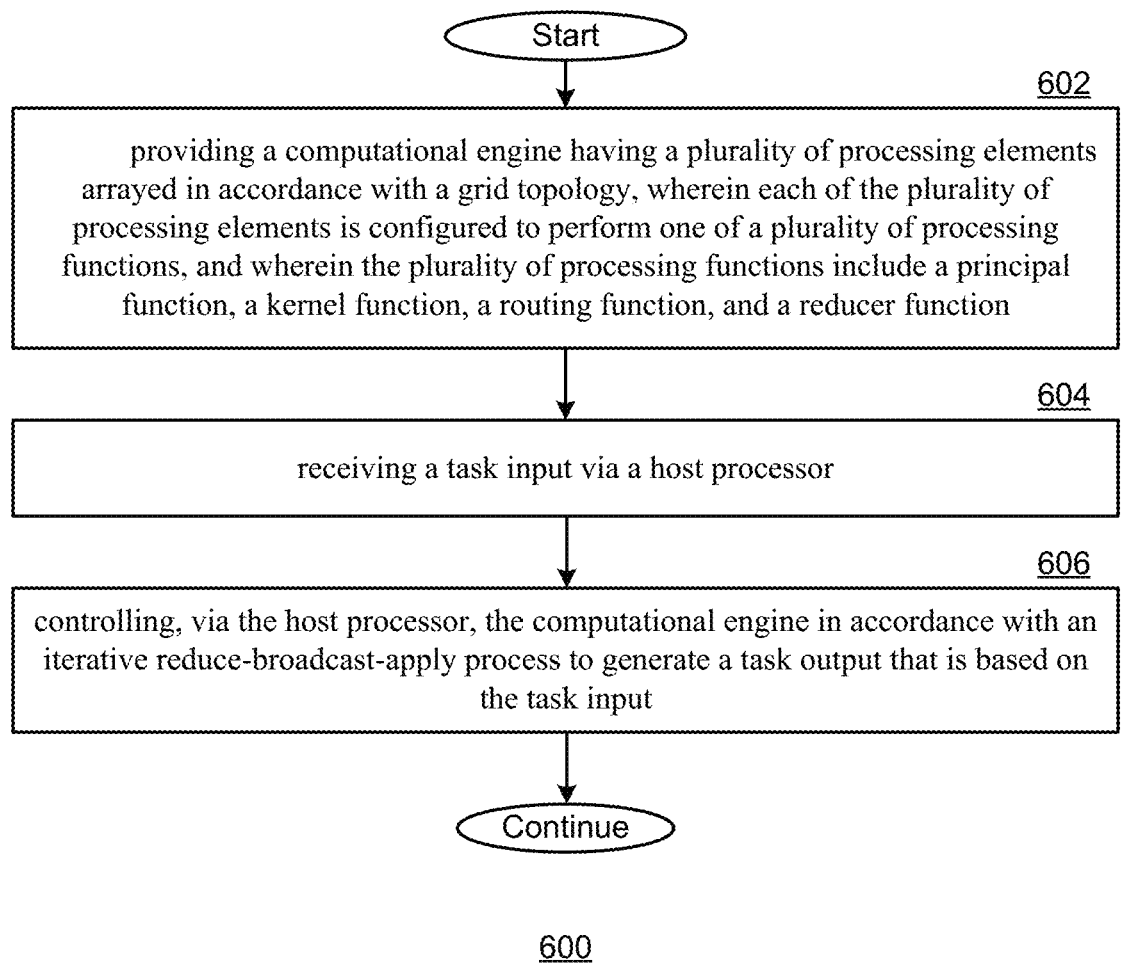
FIG. 6 is a flow diagram of an embodiment of a method in accordance with the present invention.

FIG. 6 is a flow diagram 600 of an embodiment of a method in accordance with the present invention. In particular, a method is presented for use with one or more functions and features described in conjunction with FIGS. 1-5. Step 602 includes providing a computational engine having a plurality of processing elements arrayed in accordance with a grid topology, wherein each of the plurality of processing elements is configured to perform one of a plurality of processing functions, and wherein the plurality of processing functions include a principal function, a kernel function, a routing function, and a reducer function. Step 604 includes receiving a task input via a host processor. Step 606 includes controlling, via the host processor, the computational engine in accordance with an iterative reduce-broadcast-apply process to generate a task output that is based on the task input.

In addition or in the alternative to any of the foregoing, the iterative reduce-broadcast-apply process includes a produce operation, a reduce operation, a broadcast operation and an apply operation.

In addition or in the alternative to any of the foregoing, the produce operation is implemented by a subset of the plurality of processing elements performing corresponding kernel functions that operate in parallel to generate corresponding operation shards.

In addition or in the alternative to any of the foregoing, the reduce operation is implemented by a subset of the plurality of processing elements performing corresponding reducer functions that operate to receive two operation shards as input and produce a single operation shard as output.

In addition or in the alternative to any of the foregoing, a subset of the plurality of processing elements performing corresponding router functions operate to perform message routing between others of the plurality of processing elements.

In addition or in the alternative to any of the foregoing, the iterative reduce-broadcast-apply process further includes a finalize operation and wherein the plurality of processing functions further include a principal function corresponding to performance of the finalize operation.

In addition or in the alternative to any of the foregoing, the plurality of processing elements includes a subset of processing elements that perform the finalize operation and wherein the finalize operation generates a result.

In addition or in the alternative to any of the foregoing, the broadcast operation operates to send the result of the finalize operation to the subset of the plurality of processing elements performing corresponding kernel functions.

In addition or in the alternative to any of the foregoing, the apply operation operates to applies results of the finalize operation to the subset of the plurality of processing elements performing corresponding kernel functions.

In addition or in the alternative to any of the foregoing, the apply operation is performed by a single one of the plurality of processing elements.

In addition or in the alternative to any of the foregoing, the apply operation is performed by a selected ones of the plurality of processing elements.

In addition or in the alternative to any of the foregoing, the plurality of processing elements includes a plurality of kernel patches, each kernel patch including a plurality of kernels, the plurality of operations further include a complete operation and an echo operation wherein the apply operation is implemented by performance of the complete operation by a single one of the plurality of processing elements from each kernel patch and performance of the echo operation by other ones of the plurality if processing elements.

In addition or in the alternative to any of the foregoing, the computational engine is implemented via a wafer-scale engine.

In addition or in the alternative to any of the foregoing, each of the plurality of processing elements has a dedicated memory.

In addition or in the alternative to any of the foregoing, the computational engine lacks global memory that is shared by the each of the plurality of processing elements.

In addition or in the alternative to any of the foregoing, the task input and task output correspond to a quadratic unconstrained binary optimization over a binary vector $v=(v_1, v_2, \ldots v_n)$.

In addition or in the alternative to any of the foregoing, n of the plurality of processing elements performing corresponding kernel functions each store a current value of $v_j$, where $j=1 \ldots n$.

In addition or in the alternative to any of the foregoing, each of the plurality of processing elements performing corresponding kernel functions performs a produce operation that computes a change in cost that would occur if the current value of $v_j$ was inverted for $j=1 \ldots n$, wherein the reduce operation generates an update to the current value of $v_j$ by selecting a single $v_j$ that generated a most favorable cost when inverted, wherein the broadcast operation sends the update to the current value of $v_j$ to each of the plurality of processing elements performing corresponding kernel functions and wherein the apply functions applies the update to the current value of $v_j$ to each of the plurality of processing elements performing corresponding kernel functions.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such a advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal X>5 is equivalent to determining if −X<−5, and the comparison to determine if signal A matches signal B can likewise be performed by determining −A matches −B or not (A) matches not (B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in the form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing system comprising:
   a computational engine having a plurality of processing elements arrayed in accordance with a grid topology, wherein each of the plurality of processing elements is configured to perform one of a plurality of processing functions, and wherein the plurality of processing functions include a principal function, a kernel function, a routing function, and a reducer function; and
   a host processor having at least one processing circuit and at least one memory that stores operational instructions that, when executed by the at least one processing circuit, cause the at least one processing circuit to:
   receive a task input; and
   control the computational engine in accordance with an iterative reduce-broadcast-apply process to generate a task output that is based on the task input;
   wherein the iterative reduce-broadcast-apply process includes a produce operation, a reduce operation, a broadcast operation and an apply operation;
   wherein the task input and task output correspond to a quadratic unconstrained binary optimization over a binary vector $v=(v_1, v_2, \ldots v_n)$; and
   wherein n of the plurality of processing elements performing corresponding kernel functions each store a current value of $v_j$, where $j=1 \ldots n$.

2. The computing system of claim 1, wherein the produce operation is implemented by a subset of the plurality of processing elements performing corresponding kernel functions that operate in parallel to generate corresponding operation shards.

3. The computing system of claim 2, wherein the reduce operation is implemented by a subset of the plurality of processing elements performing corresponding reducer functions that operate to receive two operation shards as input and produce a single operation shard as output.

4. The computing system of claim 3, wherein a subset of the plurality of processing elements performing corresponding router functions operate to perform message routing between others of the plurality of processing elements.

5. The computing system of claim 2, wherein the iterative reduce-broadcast-apply process further includes a finalize operation and wherein the principal function corresponds to performance of the finalize operation.

6. The computing system of claim 5, wherein the plurality of processing elements includes a subset of processing elements that perform the finalize operation and wherein the finalize operation generates a result.

7. The computing system of claim 6, wherein the broadcast operation operates to send the result of the finalize operation to the subset of the plurality of processing elements performing corresponding kernel functions.

8. The computing system of claim 7, wherein the apply operation applies results of the finalize operation to the subset of the plurality of processing elements performing corresponding kernel functions.

9. The computing system of claim 8, wherein the apply operation is performed by a single one of the plurality of processing elements.

10. The computing system of claim 8, wherein the apply operation is performed by a selected ones of the plurality of processing elements.

11. The computing system of claim 10, wherein the plurality of processing elements includes a plurality of kernel patches, each kernel patch including a plurality of kernels, the plurality of processing functions further including a complete operation and an echo operation wherein the apply operation is implemented by performance of the complete operation by a single one of the plurality of processing elements from each kernel patch and performance of the echo operation by other ones of the plurality if processing elements.

12. The computing system of claim 1, wherein the computational engine is implemented via a wafer-scale engine.

13. The computing system of claim 1, wherein each of the plurality of processing elements has a dedicated memory.

14. The computing system of claim 13, wherein the computational engine lacks global memory that is shared by the each of the plurality of processing elements.

15. The computing system of claim 1, wherein each of the plurality of processing elements performing corresponding kernel functions performs the produce operation to computes a change in cost that would occur if the current value of $v_j$ was inverted for $j=1 \ldots n$, wherein the reduce operation generates an update to the current value of $v_j$ by selecting a single $v_j$ that generated a most favorable cost when inverted, wherein the broadcast operation sends the update to the current value of $v_j$ to each of the plurality of processing elements performing corresponding kernel functions and wherein the apply operation applies the update to the current value of $v_j$ to each of the plurality of processing elements performing corresponding kernel functions.

16. A method comprising:
providing a computational engine having a plurality of processing elements arrayed in accordance with a grid topology, wherein each of the plurality of processing elements is configured to perform one of a plurality of processing functions, and wherein the plurality of processing functions include a principal function, a kernel function, a routing function, and a reducer function;
receiving a task input via a host processor; and
controlling, via the host processor, the computational engine in accordance with an iterative reduce-broadcast-apply process to generate a task output that is based on the task input;
wherein the iterative reduce-broadcast-apply process includes a produce operation, a reduce operation, a broadcast operation and an apply operation;
wherein the produce operation is implemented by a subset of the plurality of processing elements performing corresponding kernel functions that operate in parallel to generate corresponding operation shards;
wherein the iterative reduce-broadcast-apply process further includes a finalize operation and wherein the principal function corresponds to performance of the finalize operation;
wherein the plurality of processing elements includes a subset of processing elements that perform the finalize operation and wherein the finalize operation generates a result; and
wherein the broadcast operation operates to send the result of the finalize operation to the subset of the plurality of processing elements performing corresponding kernel functions.

17. The method of claim 16, wherein the task input and task output correspond to a quadratic unconstrained binary optimization over a binary vector $v=(v_1, v_2, \ldots v_n)$.

18. The method of claim 17, wherein n of the plurality of processing elements performing corresponding kernel functions each store a current value of $v_j$, where $j=1 \ldots n$.

19. The method of claim 16, wherein the reduce operation is implemented by a subset of the plurality of processing elements performing corresponding reducer functions that operate to receive two operation shards as input and produce a single operation shard as output.

20. The method of claim 16, wherein the computational engine is implemented via a wafer-scale engine.

* * * * *